June 14, 1960
D. FLECHTNER ET AL
2,941,188
PRINTER CONTROL SYSTEM
Filed July 1, 1954
5 Sheets-Sheet 4
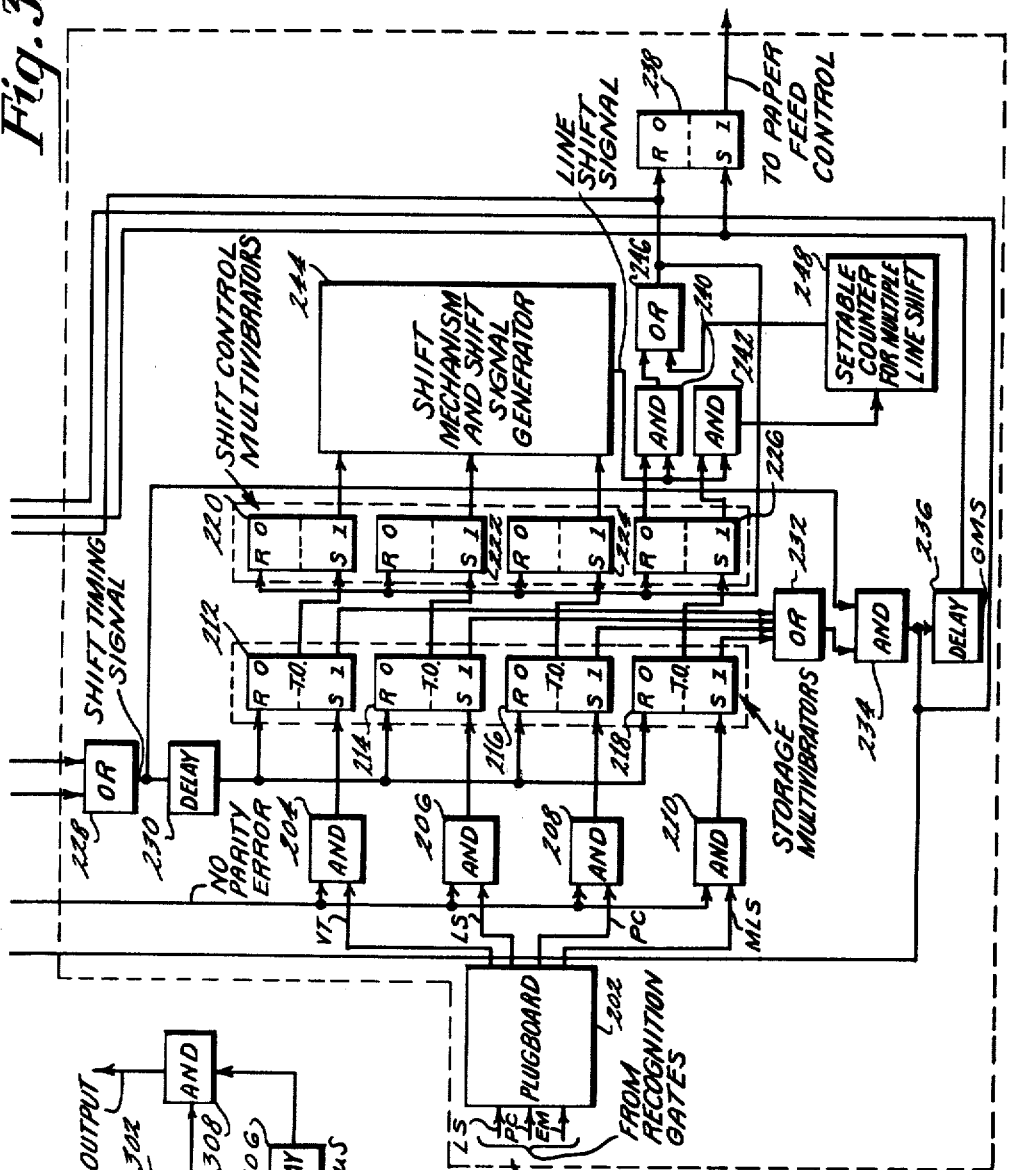
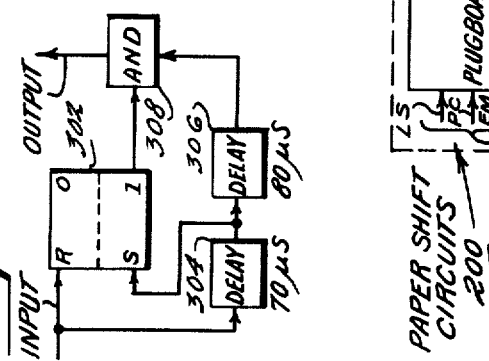
INVENTOR.
Donald Flechtner
& Carl C. Eickel
BY
ATTORNEY

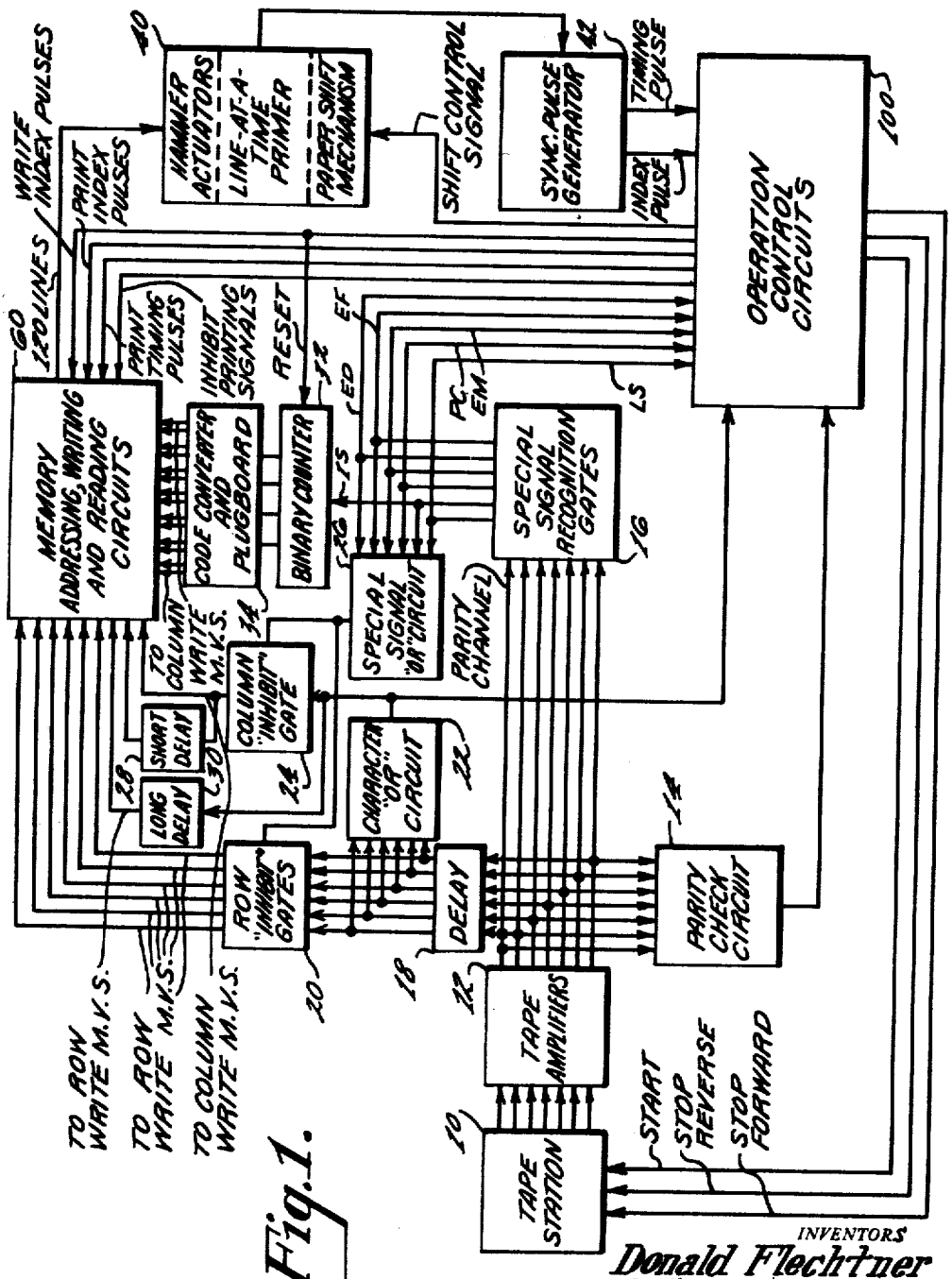

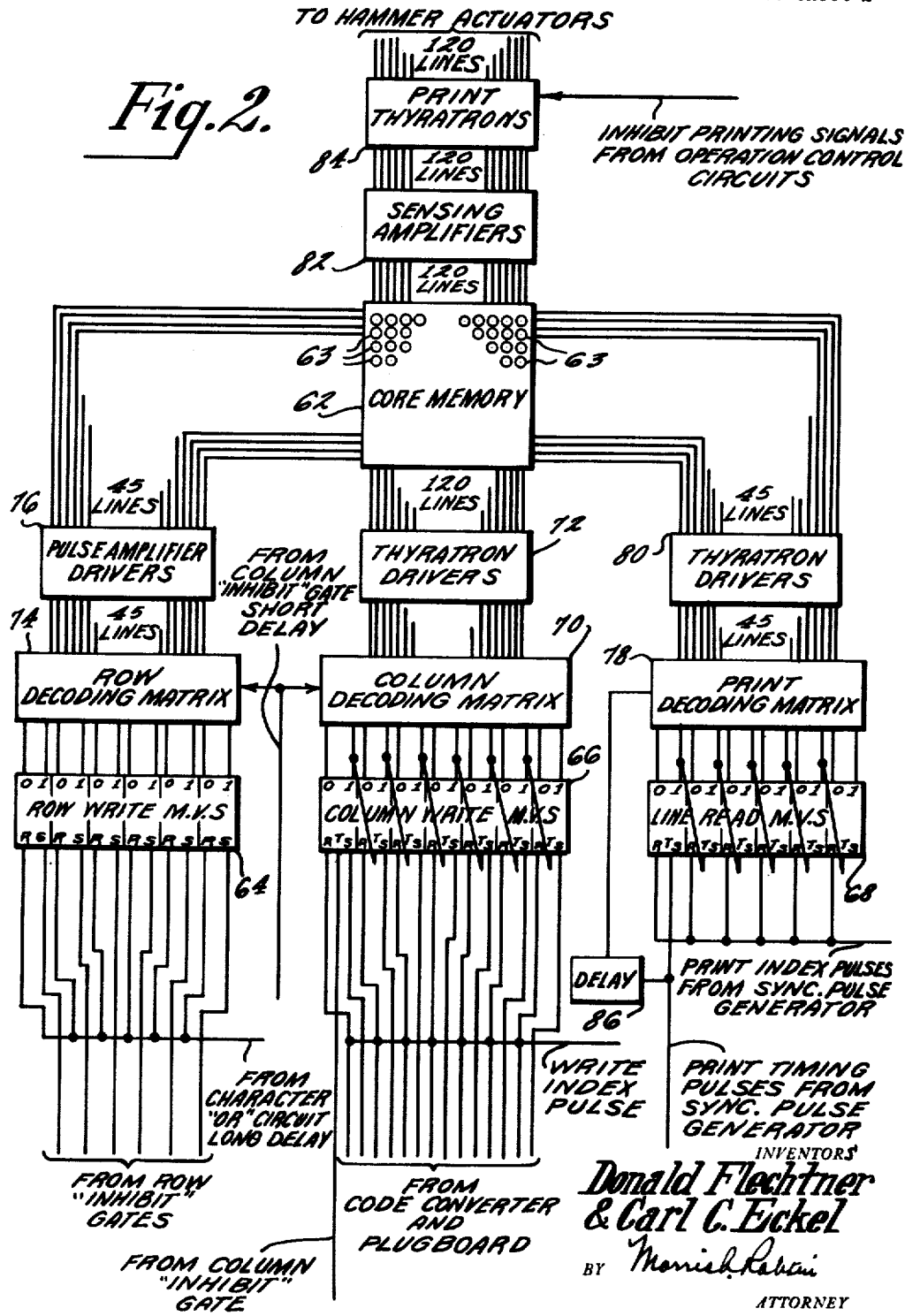

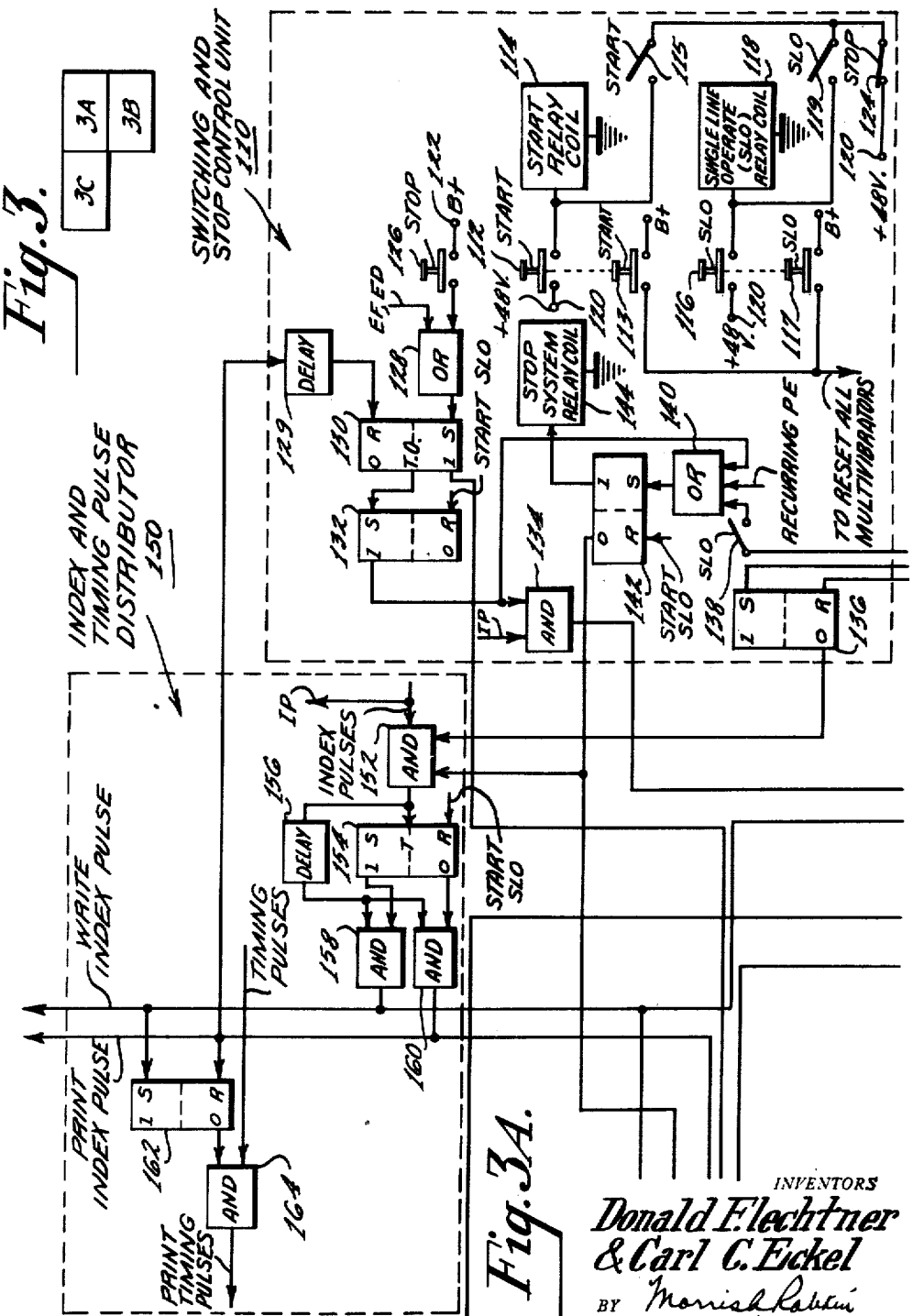

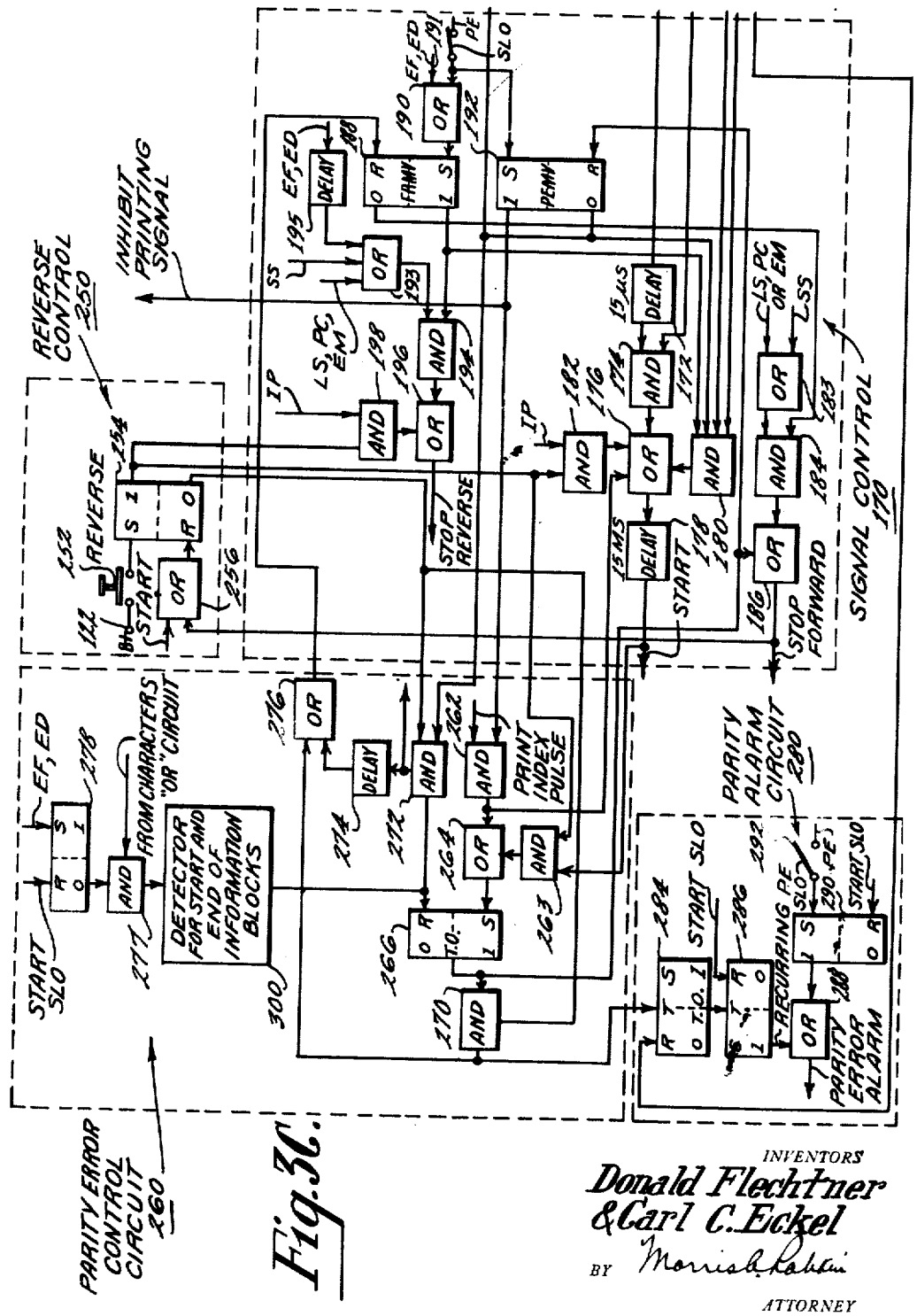

United States Patent Office 2,941,188
Patented June 14, 1960

2,941,188
PRINTER CONTROL SYSTEM
Donald Flechtner, Hoboken, and Carl C. Eckel, Pennsauken, N.J., assignors to Radio Corporation of America, a corporation of Delaware Filed July 1, 1954, Ser. No. 440,831
7 Claims. (Cl. 340—174)

This invention relates to control systems, and particularly to a system for controlling the operation of a high speed printing device.

High speed devices for the reproduction of information are today increasingly employed in data-processing systems. The speed of a computer or other information handling system in processing information often far exceeds the speed of the output section of the system. Therefore, the information handling system speed of operation is obstructed by the lack of adequate speed of the output section.

A number of output printing devices for information handling machines are described in an article written by J. C. Hosken, entitled "Survey of Mechanical Printers," and published in the "Review of Input and Output Equipment Used in Computing Systems" (March 1953), pp. 106–112. Various control systems for output devices are also described in the above mentioned article. While the printing mechanism itself may be quite simple, the control system for the printer may be considerably more complex. A large number and variety of devices are employed today to overcome the problems encountered in designing a rapid, reliable, flexible, and yet economical control system. Preferably, a control system is capable of receiving encoded information, arranging the information in a form desired, and then actuating the output device. For example, it may be desired to read information off an asynchronous storage medium such as magnetic tape, to tabulate various groupings of information horizontally across a printing line, to detect and correct, if possible, errors in the transmission of information, and to actuate a printing mechanism employing continuously rotating type wheels.

Because many data-processing systems employ the binary system of notation, the control system for an output device may be designed to operate from information in binary notation. In particular, a binary-decimal notation may be employed. Binary-decimal notation represents each decimal value from 0 to 9 by a binary equivalent, but represents decimal digits of ten or greater by a series of the individual binary equivalents of 0 to 9. The notation also may assign particular binary combinations, other than the numeric values of decimal 0 to 9, to alphabetic characters and special symbols, and thus represent alphabetic as well as numeric intelligence. Such a system is often called an alphanumeric system of notation. The special symbols may represent the start and end of messages, the termination of individual items within the messages, or other information of special significance to a data handling system.

Accordingly, it is an object of this invention to provide an improved control system for a high speed printer, which control system has greater rapidity, flexibility, and reliability of operation than the systems of the prior art.

Another object of this invention is to provide an improved control system for a high speed printer of the line-at-a-time type, said control system having greater flexibility than control systems heretofore known.

Yet another object of this invention is to provide an improved system for translating information read from an asynchronous medium into signals suitable for operating a high speed printer, which system has greater rapidity and flexibility than the devices of the prior art.

A further object of this invention is to provide an improved control system for operating high speed printers, which control system provides horizontal tabulation, variable line shift, and verification of its own operation with a simpler arrangement than those previously available.

Yet another object of this invention is to provide a system of translating information recorded on magnetic tape into signals for actuating a line-at-a-time printer, which system may operate the printer in a variety of modes, may detect and overcome transient errors, and may operate with a rapidity greater than the systems of the prior art.

In accordance with this invention, information is read from magnetic tape and used to control a line-at-a-time printer. A static magnetic memory is employed for intermediate storage of the information. Special signals are recognized during the reading of input information, and these special signals are used to control horizontal tabulation in each printing line. As a character is read in, a signal is stored in the column of the static magnetic memory corresponding to the column in which the character is to be printed. The position of the stored signal within the column corresponds to the character identity to be printed by the print wheel. During a first revolution of the print wheels characters are written into the memory. In the next revolution the character signals are read out of the memory. The character signal in each column actuates a printing hammer at the time the desired character on the print wheel is in printing position.

In accordance with another feature of the invention, the control system carries out a correction procedure on the detection of transient errors. When an error is found in reading a character, the control system completes the block of information then being written into the memory, inhibits the printing of the block of information, and repeats the writing and printing cycles with the same block of information once more. In accordance with further features of the invention, the input to the printer may be operated continuously, stopped, reversed, or operated a single line-at-a-time for testing purposes.

The novel features of the invention, as well as the invention itself, both as to its organization and method of operation, will best be understood from the following description, when read in connection with the accompanying drawings, in which like reference numerals refer to like parts, and in which:

Fig. 1 is a block diagram of an arrangement for practicing the invention incorporating memory circuits and operation control circuits;

Fig. 2 is a block diagram of memory addressing, writing, and reading circuits which may be employed in the arrangement of Fig. 1;

Figs. 3A, 3B, and 3C, when taken together, make up Fig. 3, which is a block diagram of an operation control circuit which may be employed in the arrangement of Fig. 1 and which employs a detector for the start and end of information blocks; and Fig. 4 is a block diagram of a circuit which operates as a detector for the start and end of information blocks in the arrangement of Fig. 3C.

The overall arrangement of a system for practicing the invention is shown in Fig. 1. Input information (refer to Fig. 1) is derived in the form of pulses in seven parallel channels. These pulses originate in various combinations as from a record on a magnetic tape (not shown) read at the tape station 10. Each pulse combination in this example forms a binary combination representing a desired character, number, or special symbol. One of the channels is reserved for a so-called parity digit. The parity digit is employed to provide a total even number of binary "1's" from each character. If an error occurs in one digit of a character, therefore, the error may be detected.

The output of the tape station 10 is directed through tape amplifiers 12 to a parity check circuit 14. Tape reading stations, by which term is meant arrangements for controlling tape motion as well as arrangements for reproducing signals, and tape amplifiers, are well known and therefore are not further described. The parity check circuit 14 determines whether there is the desired even total of binary "1's" in each character, and provides a signal when the desired condition does not exist. A suitable parity check circuit 14 is shown and described in the patent entitled "Parity Check System," No. 2,719,959, issued to L. C. Hobbs, and assigned to the assignee of the present invention.

The outputs of the tape amplifiers 12 are also directed to a group of special signal recognition gates 16 and individually to delay lines 18. The special signal recognition gates 16 provide an output in a different one of a number of output channels on the occurrence of a particular special signal combination. An example of a recognition gate 16 which may be employed is shown and described in a copending application for patent entitled "Data Selection Device," Serial No. 431,627, filed May 24, 1954, by L. A. Fernandez Rivas, and assigned to the assignee of the present invention. As described in the Rivas application, a recognition gate may provide a high level output when the proper configuration of input signals is present and a low level output at other times. A number of these recognition gates may be employed, each responsive to a different signal configuration, or character. Note that the operation of these gates requires the provision of high level input signals in separate binary "1" and "0" paths for each binary digit. The signals derived from the tape may indicate a binary "1" by the presence of a signal and a binary "0" by the absence of a signal. To provide signals in separate binary "1" and "0" paths from the tape signals, pulse transformers may be used to generate phase and paraphase signals for each binary digit. The special signal combinations or characters which are to be recognized in this arrangement include item separator (IS), end data (ED), end file (EF), line shift (LS), page change (PC), and end message (EM) signals.

The outputs of the delay lines 18 to which the tape amplifiers 12 are coupled provide signals to a number of parallel row "inhibit" gates 20 and to a character "or" circuit 22. "Or" circuits, "and" gates, and "inhibit" gates are well known in the computing art. All three circuits are mentioned, for example, in the "Glossary of Terms in the Field of Computers and Automation," Computers and Automation, vol. 3, No. 10, December 1954, pages 8 through 23, and also in the Proceedings of the IRE, 1951, volume 39, pages 271 through 277. Such circuits provide the following functions: (1) An "or" circuit provides an output only if a signal is present on any one or more of a plurality of inputs, (2) an "and" gate provides an output only if signals are present on all of a plurality of inputs, and (3) an "inhibit" gate provides an output only if signals are present on any one or more particular inputs and at the same time not present on other particular inputs. "Inhibit" gates are also sometimes termed "and not" and "but not" gates.

The output of the character "or" circuit 22 is directed to the signal input of an "inhibit" gate here termed a column "inhibit" gate 24. The outputs of the special signal recognition gates 16 are directed through a special signal "or" circuit 26 to the inhibit inputs of the row "inhibit" gates 20 and the column "inhibit" gate 24. The outputs of the row "inhibit" gates 20 and the column "inhibit" gate 24 and the output of the character "or" circuit 22, the latter after being retarded in a short delay line 28, are directed to memory addressing, writing, and reading circuits 60. The output of the characters "or" circuit 22 is also directed, through a long delay line 30, to the memory circuits 60.

The IS output of the special signal recognition gates 16 is applied to the trigger input of a binary counter 32. The counter 32, by well known means, may provide a four digit binary count of the IS symbols occurring in each block of information. The outputs of the binary counter 32 are directed to a code converter and plugboard arrangement 34, the purpose of which is to provide, selectively, a different seven digit binary output for each count on the binary counter. For this purpose the arrangement 34 may employ a binary-to-single position converter responsive to the binary counter 32, a plugboard for rearranging the outputs of the converter, and a single-position-to-binary converter for setting up the desired seven digit binary output for each single position input. Examples of such converters are shown at pages 42 and 43 of the book "High Speed Computing Devices," written by the Staff of Engineering Research Associates and published by the McGraw-Hill Book Company (1950). The memory addressing, writing, and reading circuits 60 will be described more fully hereinafter in connection with Fig. 2.

The LS, PC, EM, EF, and ED outputs of the special signal recognition gates 16 are directed to operation control circuits 100, the arrangement and functioning of which will be described in connection with Fig. 3. The operation control circuits 100 provide, on separate conductors, tape station 10 control signals for starting and stopping the tape. These control signals are here called start, stop reverse, and stop forward signals. In operation, the tape station 10 responds to a stop reverse signal by stopping the tape and causing the next start of the tape to be in a reverse feed or rewind direction. The tape station 10 responds to a stop forward signal by stopping the tape and causing the next start of the tape to be in the forward direction. The tape station 10 responds to a start signal by starting and driving the tape in the direction determined by the previous stop signal. The outputs of the parity check circuit 14 and the characters "or" circuit 22 are directed to the operation control circuits 100. The operation control circuits 100 also provide inhibit printing signals to the memory circuits 60.

The output of the memory addressing, writing, and reading circuits 60 is used to control a line-at-a-time printer 40 such as described in the J. C. Hosken survey article mentioned above. Such a printer 40 may print 120 characters per line, so that 120 separate output lines are directed from the memory circuits 60 to the hammer actuators of the printer 40. Each type wheel may have forty-five different characters, including twenty-six alphabetic, ten numeric, and a number of special characters. The printer 40 may operate with a speed of ten lines per second, each line containing a maximum of 120 characters or having a maximum of four horizontal tabulating positions in this arrangement. The paper shift mechanism may be considered as a part of the printer structure and control and is not described in detail here. One output of the operation control circuits 100 designated shift control signal controls the paper shift mechanism of the printer 40.

A synchronizing pulse generator 42 is coupled to receive from the printer 40 two different types of signals: (1) A timing pulse as each character position on the print wheel passes the printing position, and (2) an index pulse at the start of each revolution. Many techniques are available for generating these signals, and thus the sync pulse generator 42 is described only briefly.

The timing pulse and index pulse signals may originate by reading a magnetic timing track on a drum or by detecting spaced notches in a disc with an associated light and photo-electric cell. The timing track drum or the notched disc may be coupled directly to the print wheel and rotated at the same speed as the print wheel. A longer track pulse, or a larger notch, may be used to generate the index pulse. The index pulse may be distinguished from each of the timing pulses by an integrating circuit or other form of known pulse width discriminator.

The two outputs from the sync pulse generator 42, one carrying index pulses and the other carrying timing pulses, are coupled to the operation control circuits 100. The operation control circuits 100 distribute the pulses from the sync pulse generator 42 into write index pulses, print index pulses and print timing pulses. Each of these pulses is applied to the memory circuits 60, in addition to the inhibit printing signals from operation control circuits 100 previously described. The write index pulses also reset the binary counter 32.

The type of memory employed herein, and the circuits for addressing and reading from the memory, are variations on a general system described by J. A. Rajchman in an article entitled "A Myriabit Magnetic Core Matix Memory," published in the October 1953 issue of the Proceedings of the IRE, pages 1407–1421. A generalized system is shown in Fig. 15 on page 1419 of that article. Reference may be made to the article for a detailed description of the manner in which magnetic cores may be used to store information.

The memory and associated circuits (refer to Fig. 2) of the present system receive information from various sources in the system and provide print signals to the line-at-a-time printer of Fig. 1. The system employs 120 printing hammers and actuators, and accordingly 120 magnetic cores 63 are used in each line along one direction or dimension in the memory matrix 62 plane. The system also employs forty-five characters, so that forty-five cores 63 are present in each line in the other direction in the matrix 62. The figure shows a rectangular matrix 62 with vertical columns and horizontal rows of cores, each column having forty-five cores and each line having 120 cores, thus presenting a rectangular array in substantially a single plane. Other arrays may also be employed. Input signals are provided to three bistable multivibrator arrangements, here termed the row write multivibrators 64, the column write multivibrators 66, and the line read (or print) multivibrators 68. Bistable multivibrators are well known in the computing art. In this specification, the input to one section of the bistable multivibrator is termed the reset (R) input and the output of the same section is termed the "0" output. The input to the other section of the multivibrator is termed the set (S) input, and the corresponding output is termed the "1" output. As is well known, the application of the signal to an input causes the multivibrator to assume a stable condition in which the section corresponding to that input is conducting and providing a useable signal output. The arrangement of the row write multivibrators 64 is essentially a parallel grouping of six individual multivibrators. Signals from the characters "or" circuit are applied by way of the long delay 30 to the reset input of each of the row write multivibrators 64 and signals from the row "inhibit" gates 20 are applied to the set input of each of the row write multivibrators 64. The characters "or" circuit and the row "inhibit" gates are units to be found in Fig. 1.

A bistable multivibrator may also utilize a trigger (T) input, the application of signals to which reverses the steady state conduction of the multivibrator to the section which was not previously conducting. The column write multivibrators 66 comprise a chain of seven such multivibrators. The "1" outputs of each of these multivibrators is coupled to the trigger input of the succeeding multivibrator, thus providing a conventional binary counter chain. The reset input of each of the different column write multivibrators 66 is responsive to a signal from a different output channel of the code converter and plugboard of Fig. 1. Similarly, the set input of each of the column write multivibrators 66 is responsive to a different output from the code converter and plugboard. The trigger input of the first, or lowest order, column write multivibrator is responsive to signals from the column "inhibit" gate 24 of Fig. 1.

The line read multivibrators 68 each have trigger inputs and are coupled together in a binary counter chain. The trigger input of the lowest order multivibrator is responsive to print timing pulses from the sync pulse generator 42 of Fig. 1. The reset inputs of each of the multivibrators 68 is responsive to print index pulses from the sync pulse generator.

The previously mentioned multivibrator arrangements set up particular combinations for writing information into or reading information out of the cores 63. To convert this information into a desired signal addressing arrangement decoding matrices 70, 74, 78 are employed. A column decoding matrix 70 responsive to the column write multivibrators 66 generates a signal in any one of 120 lines in response to a seven digit binary input. This decoding matrix 70 may be of the type described in the copending application for patent entitled "Code Conversion System," Serial No. 439,620, filed June 28, 1954, by James M. McCulley and assigned to the assignee of the present invention. The above-identified McCulley application employs a number of matrices and an array of tubes to generate a signal of desired power in one of 120 lines economically and efficiently. The system may utilize the output drivers as part of the decoding system, but here thyratron drivers 72 are shown separately for clarity in the drawing. The 120 lines from the thyratron drivers 72 are each coupled to a different column in the core memory 62. As described in the McCulley application the column decoding matrix 70 may provide a pulse output if desired. Pulses for this purpose are derived from the short delay line 28 of Fig. 1.

The outputs of the row write multivibrators 64 are coupled to a row decoding matrix 74 which provides forty-five separate lines as output. This decoding matrix 74 may be of the type previously referred to although reduced in number of inputs and outputs. Each of the forty-five lines in the output of the row decoding matrix 74 is coupled through one of a number of pulse amplifier drivers 76 to a different row or line of the core memory 62. Signals for providing a pulse effect are derived from the short delay line 28 of Fig. 1.

The outputs of the line read multivibrators 68 are coupled to a print decoding matrix 78 having a one-out-of-forty-five row output similar to the line decoding matrix 74. These outputs are again directed through thyratron drivers 80 to a different horizontal row or line in the core memory 62. Print timing pulses are also applied, through a delay line 86, to the print decoding matrix 78 for providing a pulse output from the matrix 78.

The 120 lines of output from the core memory 62 are directed through sensing amplifiers 82 and print thyratrons 84 to the hammer actuators of Fig. 1. The various amplifiers and drivers utilized in this system may be of types well known in the art and are therefore not more fully described.

System operation

In normal operation (refer to Fig. 1), the system starts with the actuation of a start switch in the operation control circuits 100. The line-at-a-time printer 40 is at this time running at full speed, supplying index and timing pulses through the associated sync pulse generator 42. Information encoded on the input tape is assumed to be in block form, each of the blocks constituting a line or row of information to be printed. The provision of these blocks may be accomplished by a number of well known means and techniques, including computer programming techniques, and therefore is not set out in detail.

On the actuation of the start switch and on detection of a write index pulse in the operation control circuits 100, the operation control circuits 100 send a start signal to the tape station 10, starting the tape in motion. The entire block of information is read from the tape and written into the memory 60 in the time in which the print wheels complete a revolution. At the completion of the reading of the block of information the operation control circuits 100, through use of the special signal combinations, provide a stop forward signal. The stop forward signal places the tape station 10 in readiness for starting on the next block of information.

Following the completion of the write cycle, and on the beginning of the next revolution of the print wheels, the printing operation commences. The print index pulse is used to set up the print operation, and the subsequent timing pulses are used to control the generation of print signals, so that characters will be precisely spaced in a horizontal line on the printing paper. When printing is completed the paper is shifted a desired number of lines. The next writing cycle follows the print cycle immediately, and so on.

In the normal case of storing a character signal in the memory 60, when the character is not a special signal, the binary combination representing the character is directed from the tape station 10 through the tape amplifiers 12, the coupled delay lines 18 and row "inhibit" gates 20 to the memory circuits 60. In the memory circuits 60 the proper line or row out of the forty-five is selected and activated. The binary combination also provides a single signal from the characters "or" circuit 22, which signal is directed through the long delay line 30 to the memory circuits 60. The terms "short delay" and "long delay" are relative to each other and to the time period between the reading of characters on the tape. The short delay provides sufficient time to set a group of multivibrators in the memory circuits 60. The long delay provides sufficient time after the short delay for the pulse directed through the short delay line 28 to have completely terminated. Neither delay is enough to take the pulse of one character into the period of the next character. The long delay in this instance is employed to reset a row addressing portion of the memory circuits 60.

In selecting columns in the memory the operation normally begins at the left, for example as viewed in the drawing, corresponding to the left hand side of the printed page. The write index pulse from the operation control circuits 100 is employed to set the column addressing section of the memory circuits 60 at this position. When no special signals are provided, the columns are normally then advanced one to the right for each subsequent character. The signal for the advancing function is derived through the characters "or" circuit 22 and the column "inhibit" gate 24. The advancing signal activates a chain of multivibrators which constitute part of the column addressing circuits in the memory 60. When sufficient time has elapsed for the multivibrators to assume steady states following the signal, a pulse is applied through the short delay line 28 to effect switching of the desired core in the memory 60, thus writing in the desired information.

Tabulation, or the selection of particular columns for printing, is accomplished by the special signal recognition gates 16 and the code converter and plugboard 34. Each item separator (IS) special signal combination is directed through the tape amplifiers 12 to the special signal recognition gates 16. There the IS signals are recognized and an output is directed to the binary counter 32. The binary counter 32 and the code converter and plugboard 34 set up the proper binary configuration to set the memory 60 column addressing circuits to store the next character at a given column. The following characters then are set in the successive columns to the right of the given column.

The recognition of a special signal combination also provides a signal through the special signal "or" circuit 26 to the inhibit inputs of the row "inhibit" and column "inhibit" gates 20 and 24. The delayed signals applied to these gates 20, 24 from the tape amplifiers 12 accordingly cannot pass through to set up the row write circuitry or the column write circuitry in the memory circuits 60. The next character not a special signal combination then provides an output from the column "inhibit" gate 24 and is thus placed in the next column in the memory 60.

The normal printing sequence begins immediately following the writing sequence, with the generation of a print index pulse. The print index pulse from the operation control circuits 100 sets the column circuitry in the memory circuits 60 at a zero or start condition. Each of the subsequent timing pulses during the print cycle is directed to the print addressing section of the memory circuits 60. The reading is in an orderly fashion, starting with the top row or line in the memory. When a given line is tested with a print pulse, all the cores of the several columns which have stored character signals in that line provide outputs. These outputs activate the coupled print hammers, causing the character on the associated print wheels then under the hammer to be printed. The timing provided from the sync pulse generator 42 is such as to put the proper character on the paper in the same horizontal line as the other printed characters. At the end of the printing of each line, following the print cycle and during the subsequent write cycle, the paper is shifted the desired number of lines.

When a parity error is detected in operation the parity check circuit 14 provides a signal to the operation control circuits 100. These error signals start a parity error correction or verification cycle. The block of information is completed during the writing cycle, but printing is inhibited during the print cycle by an inhibit printing signal from the operation control circuits 100 to the memory circuits 60. The operation control circuits 100 then reverse the direction of tape movement and detect the start of the block of information. The block is again written in during the write cycle and is this time printed out if the error does not again occur. If the error does occur again, however, the system is stopped.

The manner in which the system operates a single line-at-a-time will be described with reference to the detailed explanation of the operation control circuits 100.

*Memory circuits operation*

Referring now to Fig. 2, the memory addressing, writing, and reading circuits perform a principal function in the conversion of information from tape to the printed form. The write index pulse is provided first, resetting the column write multivibrators 66. The row write multivibrators 64 at this point in time have previously been reset by the pulse from the long delay (Fig. 1) following the last previous character combination. During the write cycle the state of the line read multivibrators 68 is immaterial because no print timing pulses are provided.

On the reading of the first character at the tape station (assuming no special signal combination), the row write multivibrators 64 are set to staticize the binary combination of the character. The row write multivibrators 64 provide steady state outputs to the row decoding matrix 74. The row decoding matrix 74 in turn is conditioned to provide an output on a single output line. The output of the row decoding matrix 74, amplified in one of the coupled pulse amplifier drivers 76, is applied to the core memory 62 to activate one row line or lead in the memory on the occurrence of a pulse from the short delay line of Fig. 1 applied as a clock pulse to the row and column decoding matrices 74 and 70.

Following the reading of the first character in a block of information a signal is provided from the column "inhibit" gate and the coupled short delay line of Fig. 1 to the column write multivibrators 66. When the column write multivibrators 66 have all been reset by the write index pulse and the first character is not a special signal the column decoding matrix 70 is in a condition to provide an output only on its left hand (as viewed in the figure) output line. The pulse from the column "inhibit" gate and the coupled short delay of Fig. 1 activates the column decoding matrix 70 to provide an output on a given one of the 120 lines. The output pulse (again clocked by the pulse from the short delay 28) is directed through the coupled thyratron driver 72 to one column (here the extreme left hand) in the core memory 62. On the coincidence of a line or row activating pulse signal and a column activating pulse signal, sufficient current is provided to "turn over" one of the cores 63 in the memory 62. The core 63 which is to be turned over in this example is one of the cores 63 in the left hand column of the memory 62. The particular core turned over depends upon the character identity.

Subsequent character signals are directed to the proper line location in the same manner as described above. The column in which the character signals are placed is determined by the code converter and plugboard and the special signal recognition gates as described in regard to Fig. 1. If no special signal combination is detected the column "inhibit" gate 24 (Fig. 1) output is applied to the trigger input of the lowest order multivibrator of the column write multivibrators 66 of Fig. 2. The column "inhibit" gate (Fig. 1) output therefore advances the binary count staticized by the column write multivibrators 66 of Fig. 2 by one, as shown schematically in the drawing. The thus advanced count in effect moves the selected printing column one column to the right. Only after the row write multivibrators 64 and column write multivibrators 66 have had time to completely settle in a new steady state is the clock pulse supplied from the short delay line 28 (Fig. 1) to read or clock out the next character signal into the memory 62.

When a special signal combination occurs, the recognition gates provide an output to the inhibit inputs of the row and column "inhibit" gates 20, 24 (Fig. 1). Accordingly there is no pulse supplied from the column "inhibit" gate and the coupled short delay line, and no character signal is written into the memory 62. The next character signal, if not a special signal, advances the count by one in the column write multivibrators 66 and is written into the next succeeding column in the memory 62.

The print cycle begins with the print index pulses from the "sync" (synchronizing) pulse generator (Fig. 1). The print index pulses reset all the line read multivibrators 68, which staticize a steady state signal combination. The print decoding matrix 78 is conditioned by the line read multivibrators 68 in this state to provide an output on the single line corresponding to the uppermost row in the memory 62. The print decoding matrix 78 provides this output when a pulse signal is applied, in the manner described in the McCulley application. No print signals are supplied, however, until the occurrence of the first print timing pulse following the print index pulse.

Each print timing pulse, supplied only during the print cycle by the operation control circuits (Fig. 1), advances the count staticized by the line read multivibrators 68 by one. Thus the output provided by the print decoding matrix 78 is similarly advanced by one. After the line read multivibrators 68 have had sufficient time to settle fully in the new count, a delayed pulse, passed through the delay line 86, is applied to the print decoding matrix 78 to provide a pulse output. The output of the print decoding matrix 78, directed through the coupled thyratron 80, activates the chosen line coupled to a selected row of the core memory 62. In this arrangement, sufficient current is supplied by the thyratron 80 to read all cores 63 in the memory which have stored information on that row. Those cores 63 previously turned over to store a character signal then provide an output signal in their column. For example, if the characters A to Z are arranged in order on the print wheels, character signals are stored in the individual columns, and read out from the columns, in the same order. There is no rearrangement of the order of reading the storage in this example, the order starting at the top (as viewed in the figure) in each case.

The result on the printed page is the completion of an entire line during the one revolution of the print wheels in the print cycle. During the printing cycle all cores 63 are impulsed, thus, in effect, erasing all information stored in the memory 62.

The operation control circuits (refer now to Fig. 3) unite the operation of the various units shown in Fig. 1 into an integrated whole. The circuits operate the system in a number of different modes, as follows:

(1) The circuits provide a normal operation in which successive blocks of information are read from the input tape at proper times for subsequent storage and printing. In this operation the circuits also distribute the index and timing pulses.

(2) The circuits provide a single line operation, in which one block of information may be printed out for testing and verifying purposes.

(3) The circuits provide controls by which the system may be stopped or the tape may be reversed.

(4) The circuits also perform a predetermined routine on the detection of a parity error to re-check the reading of a block of information and to stop only if an error occurs twice in succession.

(5) The circuits provide means for shifting the paper variable numbers of lines.

Figs. 3A, 3B, and 3C, when taken together, form Fig. 3. In reuniting these figures, Fig. 3A and Fig. 3C should be placed side-by-side, with Fig. 3C on the left and with Fig. 3A on the right. Fig. 3B then is to be placed below Fig. 3A. In Figs. 3A, 3B, and 3C a number of conventions are employed for simplicity and clarity in explaining the invention. "And" gates, "or" circuits, and delay lines are designated simply as "and," "inhibit," "or," and "delay," respectively. Multivibrators are designated by rectangles divided into two sections by a dotted line. Each of the rectangle sections represents one section of the multivibrator. The input of one section is designated as a reset (R) input, and the corresponding output as a "0" output. The input of the other section is designated as a set (S) input, and the corresponding output as a "1" output. The multivibrators may optionally have an additional trigger input (T) and a trigger output (TO). Application of an input pulse to the trigger input reverses the levels provided from the "1" and "0" outputs. The trigger output (TO) is coupled within the multivibrator to provide a pulse output when the reset (R) input is activated and the multivibrator is changed from the "1" to the "0" state.

As a further aid to the understanding of Fig. 3 various sections have been encompassed by dotted lines. Each dotted line rectangle has been given a particular name intended to signify the principal function of the units within the rectangle. Inputs designated LS, PC, EM, EF, and ED are responsive to the correspondingly identified special signal combinations as detected at the recognition gates (not otherwise shown in Fig. 3). Inputs designated PE are responsive to parity error signals from the parity check circuit (not otherwise shown in Fig. 3).

In addition, manual switches, relay coils, and relays are employed in Fig. 3. Several manual switches are shown (Fig. 3A) in their normal positions as part of an arrangement within a dotted line rectangle labeled the switching and stop control unit 110. This arrangement may also be referred to as a "settable control means." The switches are the start, single line operate (SLO), and stop switches 112, 116, 126, respectively. The start and SLO switches 112, 116 operate start and single line operate (SLO) relay coils 114, 118, which in turn control the action of a number of relays. With reference to Fig. 3, where a relay is designated simply by start, SLO, or stop, that relay is controlled by the like-identified relay coil. The relays are shown in their normal conditions of operation, with none of the relay coils actuated. When the relay coil 118 designated SLO is actuated, for example, all ganged relays designated SLO are reversed from the positions shown, the open relays becoming closed, and vice versa. Additional manual start and SLO switches 113, 117 are mechanically coupled to the start and SLO switches 112, 116, respectively, and provide, when closed, signals from a B+ supply 122 for resetting the multivibrators of the system.

The system is ready for normal operation when the printing wheels are at normal speed and a block of information is available at the tape station. Operation is commenced by depression of the start switch 112. The start switch 112 in turn activates the start relay coil 114, which is automatically held by a start relay 115 coupling the start relay coil 114 to a +48 volt source 120. The SLO relay coil 118 has a similar self-holding relay 119 arrangement. Either holding relay 115 or 119 will be released when a normally closed stop relay 124 is opened by the stop relay coil 144.

An index and timing pulse distributor 150 provides signals for both the operation control circuits and the system as a whole. Index pulses and timing pulses are supplied from the sync pulse generator (not shown in Fig. 3). It is desired to provide alternate write and print index pulses, denoting the start of write and print cycles, respectively. It is also desired to provide print timing pulses during the print cycle.

The index pulses are directed through a three input "and" gate 152 to the trigger input of a multivibrator 154 which is reset on actuation of the start and SLO switches 112, 116. As will be described later, the remaining two inputs of this three-input "and" gate 152, hereafter termed the input "and" gate, are employed to disable the gate 152 under certain conditions. Each output of the multivibrator 154 activates, or "primes," one input of a different one of two-input "and" gates 158, 160. The outputs of the three-input "and" gate 152, after being retarded in a delay line 156, are also directed to the remaining inputs of each of the two-input "and" gates 158, 160. When the first index pulse is applied through the input "and" gate 152 to the trigger input of the multivibrator 154 that multivibrator 154 provides a "1" output. The "and" gate 158 coupled to the "1" output of the multivibrator 154 has both its inputs actuated when the delayed index pulse is also applied. The "and" gate 158 therefore provides an output at this time. The next index pulse switches the multivibrator 154, primes an input of the other "and" gate 160, and, after a delay in the delay line 156 provides an output from that other "and" gate 160. Because the cycle should start with the writing in of information to the memory the output of the "and" gate 158 providing the first output (after the start signal) is termed the write index pulse. The output of the other "and" gate 160, which initiates the print cycle, is termed the print index pulse. Both these pulses are utilized elsewhere in the system. The undelayed and ungated index pulse (IP) is also employed. Connections to the source of index pulses are not shown but are indicated simply as IP.

Print timing pulses are also needed in the system. These pulses are supplied by an "and" gate 164, one input of which may be primed by the "0" output of a second multivibrator 162 in the index and timing pulse distributor 150. The reset (R) and set (S) inputs of the multivibrator 162 are activated by the print and write index pulses respectively. Timing pulses subsequent to the print index pulse but prior to the following write index pulse, therefore, provide output signals from the "and" gate 164.

*Normal operation—start signal.*—Note that start, stop forward, and stop reverse signals are provided from arrangements within a dotted line rectangle termed the signal control 170 (Fig. 3C). As pointed out, actuation of the start switch provides that the next subsequent index pulse from the index and timing pulse distributor 150 of Fig. 3A is a write index pulse. The write index pulse is directed within the signal control 170 (Fig. 3C) through a 15 μs. delay line 172 to the signal input of an "and" gate 174. The remaining input of the "and" gate 174 is primed by the "0" output of a multivibrator 142 (Fig. 3A) in the stop control unit 110 following the actuation of the start or SLO switches 112, 116. The "and" gate 174 (Fig. 3C) therefore provides an output through an "or" circuit 176 and a 15 ms. delay 178. The thus delayed output is the start signal. In response to the start signal the tape is read at the tape station (not shown) and an entire block of information is written into the memory. This action is accomplished within the time of one revolution of the print wheels, about 50 milliseconds. The reasons for the delays of the start signal will be apparent later.

*Normal operation—stop forward.*—At the end of a block of information a special signal is provided. This signal may be one of the LS, PC, or EM signals detected by the recognition gates (not shown). Within the signal control 170 of Fig. 3C is a multivibrator 188 designated FRMV (FR multivibrator) and employed to control stop forward and reverse signals. A "0" output from the FR multivibrator 188 primes one input of an "and" gate 184 which provides stop forward outputs through an "or" circuit 186. A "1" output from the FR multivibrator 188 primes one input of another "and" gate 194 which provides stop reverse outputs through an "or" circuit 196. As will be better understood from what follows, in normal operation the FR multivibrator 188 provides a "0" output and the stop forward "and" gate 184 is primed. On the occurrence of an LS, PC, or EM signal, therefore, the remaining input of the "and" gate 184 is activated through an "or" circuit 183 and a stop forward output is provided.

The next index pulse following the stop forward output is distributed as a print index pulse. The "and" gate 174 which provided the previous start signal from the signal control 170 of Fig. 3A is therefore not activated. The next start signal does not occur until the next write index pulse, at which time the start and stop forward operation is again repeated. In normal operation this action continues until the end of a tape is reached.

*Paper shift operation.*—A dotted line rectangle designated paper shift circuits 200 (Fig. 3B of Fig. 3) encloses the arrangement which principally controls the movement of the printing paper.

Certain signals, the origin of which are described hereinafter are used in controlling paper shift. These signals include a steady state signal derived from the signal control unit 170 (Fig. 3C) indicating no parity error. The origin of the no parity error signal will be described in connection with the parity error routine of the system. The paper shift control signals also include a signal which may be called a shift timing signal. The shift timing signal signals that printing is complete so that paper shift can start. This shift timing signal may be derived from either the write index pulse or the top control 110 (Fig. 3A) so that signals from both sources are directed through the same "or" circuit 228 (Fig. 3B) of the paper shift circuits 200. Signals occurring on the recognition of certain special signal combinations (LS, PC, and EM) at the recognition gates (not shown) are also employed in the paper shift circuits 200.

A plugboard 202 may be employed for setting up the desired effect that each special signal will have on paper shift. By use of the plugboard 202, each of the special signals may provide an output in any one of four output lines. These outputs have been designated here as the vertical tabulation (VT), line shift (LS), page change (PC), and multiple line shift (MLS) outputs from the plugboard 202. Each of these outputs may be directed through a different "and" gate 204, 206, 208, or 210, a different storage multivibrator 212, 214, 216, or 218, and a different shift control multivibrator 220, 222, 224, 226. Each of the different outputs in effect is kept for a time in a separate channel.

The no parity error signal primes one input each of the four "and" gates 204, 206, 208, 210. Each of the "and" gates 204 to 210 has its remaining input responsive to the corresponding output signal from the plugboard 202, and provides an output to the set (S) input of the storage multivibrator 212, 214, 216, or 218 in the same channel. Each of the storage multivibrators 212 to 218 has its "1" output coupled through a four input "or" circuit 232 to one input of a two input "and" gate 234, and its trigger output (TO) coupled to the set (S) input of the shift control multivibrator 220 to 226 in the same channel. The shift timing signal is applied directly to the remaining input of the two input "and" gate 234, and also through a delay line 236 to the reset (R) inputs of each of the storage multivibrators 212 to 218.

A special signal (LS, PC, or EM) provided from the recognition gates is directed through the plugboard 202 to the desired "and" gate 204, 206, 208, or 210. A PC signal may be directed to the PC "and" gate 208, for example, and an EM to the MLS "and" gate 210. Assuming the PC signal occurs, in the absence of a parity error the no parity error signal is provided and the PC "and" gate 208 provides an output. The PC "and" gate 208 therefore sets the PC storage multivibrator 216 to provide a "1" output. The shift timing signal, which may be derived from the write index pulse, signals that writing into the memory is to commence and that the previous print cycle is complete. Paper shift may accordingly take place during the next write-in cycle. During the time of paper shift, however, a new paper shift signal may be read in. Therefore, the settings of the storage multivibrators 212 to 218 are transferred into the shift control multivibrators 220 to 226 by the application of the delayed shift timing signal to the reset inputs of each of the storage multivibrators 212 to 218. The multivibrator which has previously been set is the only one which provides an output at this time. Thus, in this example, only the PC storage multivibrator 216 provides a pulse output to set the corresponding PC shift control multivibrator 224 to provide a "1" output.

Prior to the transfer of information from the PC storage multivibrator 216 to the PC shift control multivibrator 224, the undelayed shift timing signal and the "1" output of the previously set PC storage multivibrator 216 activate both inputs of the two input "and" gate 234. The two input "and" gate 234 therefore provides an output which, delayed in a 6 ms. delay line 236, sets a paper feed control multivibrator 238. The "1" output of the paper feed control multivibrator 238 may be employed to actuate a paper feed control, such as a clutch (not shown).

A "1" output from any of the VT, LS, or PC shift control multivibrators 220, 222, 224 is directed to a shift mechanism and shift signal generator 244, whose function is to select the desired number of lines to be shifted, and to send out a signal when that shift has been completed. A number of means are available for accomplishing this function and so they are not more fully described here. When the desired number of lines have been shifted the line shift signal is provided, this signal being used ultimately to reset the paper feed control multivibrator 238, disabling the paper feed control (not shown).

The line shift signal activates one input each of two "and" gates 240, 242, each of which is also responsive to a different output of the MLS shift control multivibrator 226. When the MLS shift control multivibrator 226 is providing a "0" output the coupled "and" gate 240 passes the line shift signal. The output of the "and" gate 240 goes through an "or" gate 246 to reset the paper feed control multivibrator 238, terminating the paper feed control signal.

The MLS shift control multivibrator 226 is not coupled to the shift mechanism because it may be desired to vary the number of lines in multiple line shift. When no signal is provided to the shift mechanism 244 there is a line shift signal for each printing line shifted. Accordingly, when the MLS shift control multivibrator 226 provides a "1" output, the coupled "and" gate 242 provides an output signal to a settable counter 248 as each printing line is shifted. The settable counter 248, in accordance with well known techniques, provides an output when a desired predetermined count has been reached. This output is directed through the "or" gate 246 for the paper feed control multivibrator 238 to reset that multivibrator, disabling the paper feed mechanism (not shown). Through use of a separate settable counter 248, therefore, a variable multiple line shift may be obtained, besides the different amounts of shift obtainable with the shift mechanism 244.

Signals which set the paper feed control multivibrator 238 also set a multivibrator 136 (Fig. 3A) in the stop control 110. The "0" output of this stop control unit multivibrator 136 primes the input "and" gate 152 in the index and timing pulse distributor 150 of Fig. 3A. Thus, when this stop control unit multivibrator 136 is set, no further index pulses pass the "and" gate 152 of the distributor 150, and the next print cycle does not commence. When the multivibrator 136 is reset, the input "and" gate 152 is again primed. Reset of the multivibrator 136 is accomplished by the same signals which reset the paper feed control multivibrator 238 (Fig. 3B). The operation just described thus insures that the paper shift governed by the paper feed control multivibrator 238 is complete before printing begins. This feature of insuring paper shift completion before beginning to print is particularly useful where multiple line shift or vertical tabulation requires shifting the paper a considerable number of lines, for example more than five or six.

*Single line operation.*—Single line operation commences, as does the normal operation described above, except that the SLO switch 116 (Fig. 3A) is operated instead of the start switch 112. Closing of the SLO switch 116 actuates the SLO relay coil 118 and the associated relays 119, 138, 191, 292 (Figs. 3A, 3C). The next index pulse in time following the closing of the SLO switch 116 is directed through the index and timing pulse distributor 150, Fig. 3A, as a write index pulse. This write index pulse is then directed into the signal control unit 170 (Fig. 3C) to provide through the 15 µs. delay line 172, the "and" gate 174, the "or" circuit 176, and the 15 ms. delay line 178, a start signal output.

On completion of the writing-in of the block of information to the memory, an LS, PC, or EM signal is directed through the "or" circuit 183, the stop forward "and" gate 184, and the coupled "or" circuit 186 as in normal operation, thus providing a stop forward signal. The print cycle is then carried out as in normal operation.

To stop after the completion of a single line, however, the paper shift circuits 200 (Fig. 3B) and stop control unit 110 (Fig. 3A) are employed. The next write index pulse is again directed toward the start output as if to provide a signal. The signal is, however, delayed 15 µs. by the delay line 172 (Fig. 3C) and during this delay the system is stopped. The same write index pulse is also directed into the paper shift circuits 200 (Fig. 3B). There the write index pulse goes through the "or" circuit 228 to generate the shift timing signal. The shift timing signal is, as previously described, applied to the "and" gate 234 of Fig. 3B which is also responsive, through an "or" circuit 232, to the "1" outputs of the storage multivibrators 212 to 218. On completion of the reading of the block of information one of these storage multivibrators 212 to 218 will have been set by a special signal combination to provide a "1" output. At this point in time, therefore, the "and" gate 234 is activated both by a shift timing signal and a storage multivibrator 212 to 218 output, so that the "and" gate 234 provides an output. That output is applied to an SLO relay 138 (Fig. 3A) in the stop control unit 110. The relay 138 is closed on single line operation, and provides a signal through an "or" circuit 140 to the set input of a multivibrator 142 controlling the stop relay coil 144. The "1" output of the multivibrator 142 activates the stop relay coil 144. The "0" output of the multivibrator 142 primes one input each of the input "and" gate 152 and the "and" gate 174 (Fig. 3C) in the start circuit. When the multivibrator 142 (Fig. 3A) provides a low level output on its "0" side both the coupled "and" gates 152, 174 are disabled. The disabling action is rapid, and the "and" gate 174 (Fig. 3C) in the start circuit is disabled before the write index pulse has left the 15 μs. delay line 172. No start signal is provided, and further index pulses are blocked from the system.

The output of the "and" gate 234 (Fig. 3B) responsive to shift timing signals is also applied, through a 6 ms. delay line 236 to the set inputs of the paper feed control multivibrator 238 and the multivibrator 136 (Fig. 3A) in the stop control unit 110. The paper shift operation is thus begun and carried out as previously explained.

*Operation of the stop control.*—The arrangements for effecting manual and automatic stop are both shown in the rectangle designated stop control unit 110 of Fig. 3A. When a stop signal is applied manually the system completes operation on the line then being written into the memory before stopping.

On operation of the manual stop switch 126 in the stop control unit 110 a signal is applied through an "or" circuit 128 to a first of two multivibrators 130, 132 coupled together in a binary counting chain. The trigger output of the first multivibrator 130 is coupled to the set input of the second multivibrator 132. The "1" output of the first multivibrator 130 primes one input of a four input "and" gate 180 (Fig. 3C) in the signal control unit 170. The "1" output of the second multivibrator 132 (Fig. 3A) activates the stop system relay 144 through the coupled "or" gate 140 and multivibrator 142. The second multivibrator 132 "1" output also primes one input of an "and" gate 134 used for generating shift timing signals for the paper shift circuits 200 (Fig. 3B). Each of the multivibrators 130, 132 (Fig. 3A) is normally in the reset condition, the first being reset by each print index pulse, and the second being reset by start and SLO signals. The first multivibrator 130 in the binary counter is set on actuation of the stop switch 126. The next subsequent print index pulse, retarded in a delay line 129, resets the first multivibrator 130. The first multivibrator 130 then provides a trigger output to the set input of the second multivibrator 132. The "1" output of the second multivibrator 132, through the coupled "or" circuit 140 switches the associated multivibrator 142 to a "1" output and activates the stop system relay 144. Again the input "and" gate 152 is disabled and no further start may be provided. The paper should still be shifted for the printed line, however. Paper shifting is accomplished by applying the next index pulse to the "and" gate 134 which is primed by the "1" output of the second multivibrator 132 in the stop control 110 binary counter. The output of the "and" gate 134 goes into the paper shift circuits 200 (Fig. 3B) as a shift timing signal, and there the paper shifting cycle is carried out in the fashion previously described.

A normal stop of the system is provided when the end of the pertinent data or the end of a file has been reached. The end data (ED) and end file (EF) signals are recognized by the recognition gates (not shown in Fig. 3), and signals are provided to the correspondingly identified inputs (ED, EF) in the operation control circuits. These signals initiate a cycle of operation in which the last block of information is printed out, the paper is shifted, and the tape is rewound.

On the provision of an EF or ED signal, the first effects in time are the setting of the FR multivibrator 188 (Fig. 3C) in the signal control 170 and the first counter multivibrator 130 (Fig. 3A) in the stop control 110. Each signal is applied through a coupling "or" circuit 190, 128. The resultant "1" output of the FR multivibrator 188 (Fig. 3C) primes one input of a two input "and" gate 194. An EF or ED signal is also applied through a delay line 195 and an "or" circuit 193 to the remaining input of the primed "and" gate 194. The delay 195 retards the EF or ED signal sufficiently for the FR multivibrator 188 to settle completely. When the end of a block of information is reached and one of the ED or EF signals (instead of a PC, LS, or EM signal) is provided the "and" gate 194 provides an output through an "or" circuit 196 to the stop reverse control of the tape station (not shown). The tape is therefore ready to be started for rewind.

To start the rewind operation a four input "and" gate 180 is employed to energize the "or" circuit 176 coupled to the start output of the system. One of the inputs of this "and" gate 180 is primed by "1" outputs from the FR multivibrator 188. Another is primed by "1" outputs from the first multivibrator 130 (Fig. 3A) in the binary counting chain in the stop control unit 110. A third input is primed by "0" outputs from a multivibrator 192 (Fig. 3C) used in the parity error operation and designated the PE multivibrator 192. As will be seen later, the PE multivibrator 192 provides the "0" output desired here except when a parity error has occurred. Thus three inputs of the four input "and" gate 180 are primed, and the gate 180 provides an output on the application of a fourth input from the print index pulse. The tape is therefore started in the desired rewind operation and may be stopped, if desired, when completely rewound by automatic means well known in the art.

The print index pulse is also used to effect the final shifting of paper and the stopping of the system. The pulse is applied, through a delay line 129 (Fig. 3A) having a period long enough to insure the commencement of the just described start operation, to the reset input of the first multivibrator 130 in the binary counting chain in the stop control unit 110. The first multivibrator 130 having just previously been in the set condition, provides a trigger output pulse and the second multivibrator 132 is switched to provide a "1" output. The operation thereafter is the same as that previously described in connection with the manual stop operation. Briefly, the stop system relay coil 144 is activated, the input "and" gate 152 is disabled, a shift timing signal is provided (on the succeeding index pulse), and the paper is shifted the desired number of lines.

*Reverse operation.*—In the reverse operation it is desired to stop the tape at the end of the cycle then underway, to reverse the tape back to the start of the block of information, and then to stop. The cycle initiates on actuation of the manual reverse switch 252 (Fig. 3C) in the reverse control 250. The reverse switch 252, when closed, sets a reverse multivibrator 254. The "1" output of the reverse multivibrator 254 is directed to the signal control 170. There the output primes two "and" gates: (1) An "and" gate 198 which provides a stop reverse output through the stop reverse "or" circuit 196 and (2) an "and" gate 182 which provides a start output through the start "or" circuit 176 and the coupled 15 ms. delay line 178.

On the next index pulse both these "and" gates 198 and 182 are fully activated. Both therefore provide outputs through their coupled "or" circuits 196 and 176, respectively. The output of one "and" gate 198 provides a stop forward signal without delay. The output of the other "and" gate 182, however, is delayed 15 milliseconds in the delay line before providing a start signal. The added delay in the start signal permits the tape station to fully stop the tape before the start in the reverse direction is begun.

The reverse cycle is now completed when the block of information has passed backward through the tape station. To determine that the start of the block of information has again been found, and to stop the system when this occurs, a portion of a parity error control circuit 260, Fig. 3C, is employed.

In the parity error control circuit 260 is a parity error control multivibrator 266 having a trigger output coupled to the stop forward "or" circuit 186. The set (S) input of the parity error control multivibrator 266 is responsive, through an "or" circuit 264, to the output of a two input "and" gate 263. The set input of this "and" gate 263 is in turn responsive to "1" outputs from the reverse control multivibrator 254, and to the delayed start signal from the 15 ms. delay line 178. The reset (R) input of the parity error control multivibrator 266 is responsive to a detector 300 of the start and end of information blocks, which detector 300 will be described with reference to Fig. 4. Signals from the characters "or" circuit of Fig. 1 are applied to the detector 300 through an "and" gate 277 which is primed by the "0" output of am ultivibrator 278 which is reset by start and SLO signals and set by EF and ED signals.

In operation, the detector 300 determines that the end or start (when the tape is reversed) of a block of information is at the tape station. The detector 300 thereupon provides an output to reset the parity error control multivibrator 266 at some time after the tape has been started in the reverse direction. On shifting from the set to the reset condition the parity error control multivibrator 266 provides a pulse output. This pulse output is directed to the stop forward "or" circuit 186, providing a stop forward output. The same stop forward output is directed, through an "or" circuit 256 to the reset side of the reverse multivibrator 254, resetting that multivibrator 254 to provide a "0" output. The reverse multivibrator 254 may also be reset, through the "or" circuit 256, by start signals. Note the function of the multivibrator 278 which controls inputs to the detector 300. Inputs are applied to the detector 300 except when EF or ED signals have been provided to start rewind. Thus reverse is only a single block of information at a time in all cases but complete rewind.

*Parity error routine.*—The parity error operation utilizes the switching and stop control unit 110 (Fig. 3A), the index and timing pulse distributor 150 (Fig. 3A), the signal control unit 170 (Fig. 3C), the paper shift circuits 200 (Fig. 3B), the reverse control 250 (Fig. 3C), the parity error control circuit 260 (Fig. 3C), as well as an additional parity alarm circuit 280 (Fig. 3C). Parity error signals are applied at certain points throughout the system at the inputs designated PE.

Briefly, the desired operation on the detection of a parity error is repetition of the writing and printing cycle on the same block of information to determine whether the error occurs again. Printing and paper shift are blocked if a parity error is found in normal operation. Because a number of different operations are involved the parity error routine will be broken down into several descriptions, as follows:

(1) The parity error routine employed when a parity error is detected on the first reading of a block of information but not on the second.

(2) The parity error routine employed when errors are found on both readings of the same block of information.

(3) The effect of a parity error in single line operation.

(1) *Single parity error—normal operation.*—Assuming a normal sequence of operation, a parity error signal may be provided from the parity check circuit (not shown in Fig. 3) at some time during the write cycle. The signal is applied through the closed SLO relay 191 and the coupled "or" circuit 190 to the set input of the FR multivibrator 188 in the signal control unit 170. The same signal is also applied to the set input of the PE multivibrator 192 in the same unit 170. Both the FR and the PE multivibrators 188 and 192 provide "1" outputs, these outputs setting up the parity error routine.

The "1" output of the FR multivibrator 188 primes the "and" gate 194 in the stop reverse output circuit. The "1" output of the PE multivibrator 192 provides an inhibit printing signal to the memory circuits of Fig. 2. This inhibit signal may be inverted, if desired, to provide a low potential supply to keep the print thyratrons from firing. Steady state signals from the "1" output of the PE multivibrator are also supplied to prime an "and" gate 262 in the parity error control circuit 260. Because the no parity error signal supplied to the paper shift circuits 200 is derived from the "0" side of the PE multivibrator 192 the "and" gates 204 to 210 in those circuits 200 block the passage of special signal combinations. Thus printing and paper shift are both prevented for the duration of the write cycle and the print cycle.

When the termination of the block of information at the tape station is detected by the occurrence of a special signal combination (LS, PC, or EM), a stop reverse signal is provided. This signal is derived from the "and" gate 194 and "or" circuit 196 in the stop reverse circuit. The next signal provided is the signal for starting in the reverse direction. This signal is provided by the "and" gate 262 in the parity error control circuit 260 on the print index pulse generated at the start of the next cycle. The output of the "and" gate 262 is applied to the "or" circuit 176 in the start circuit. A start output thus is directed through the 15 ms. delay line 178 to the tape station (not shown).

It is desired to stop the reverse movement of the tape when the entire block of information has been rewound, and to again write the same information into the memory, and print if no error occurs. The sequence for accomplishing this part of the operation originates in the parity error control circuit 260 at the detector 300 and the parity error control multivibrator 266. The output of the "and" gate 262 provided at the time of starting in the reverse direction is directed through an "or" circuit 264 to set the parity error control multivibrator 266. The detector 300 thereafter provides an output, indicating that the block of information has been run past the tape station in the reverse direction. The output of the detector 300 resets the parity error control multivibrator 266, which then provides a pulse output. The pulse output has the effects of providing a stop forward signal through the stop forward "or" circuit 186, resetting the PE multivibrator 192, and impulsing, through an "and" gate 270, the parity alarm circuit 280.

In the parity alarm circuit 280 are first and second multivibrators 284, 286, respectively, coupled together as a binary counter. The first multivibrator 284 has a trigger input responsive to the output of the parity error "and" gate 270, and a reset input responsive to shift control signals from the paper shift circuits 200. The first multivibrator 284 also has a trigger output coupled to the trigger input of the second multivibrator 286, the reset input of which is activated by start and SLO signals. The "1" output of the second multivibrator 286 is coupled through an "or" circuit 288 to the parity error alarm (not shown), and is termed the recurring parity error signal because the parity error must occur twice for this output to be provided. The first pulse from the parity error control circuit 260 finds both multivibrators 284, 286, reset, and triggers the first multivibrator 284 to the set condition. A second pulse resets the first multivibrator 284, impulsing the trigger input of the second multivibrator 286 and providing a "1" output (the recurring PE signal) from that multivibrator. Note that in this example we assume only a first parity error and not a second.

The trigger output of the parity error control multivibrator 266 which is used to provide a stop forward signal is also utilized to condition the system for the subsequent repetition of the write and print cycles. The output is directed through a parity error "and" gate 270 which is primed by the "0" output of the reverse multivibrator 254. The "and" gate 270 output is applied through an "or" circuit to the reset input of the FR multivibrator 188. Thus the FR and PE multivibrators 188, 192 are now both reset, and with the exception of the parity alarm circuit 280 the system is in readiness for the next complete write and print operation. The next write index pulse provides a start signal and commences the writing of information into the memory as previously described. If no parity error occurs on the second reading of the information, the operation continues and the first multivibrator 284 in the parity alarm circuit 280 is reset by the shift control signal from the "and" gate 234 (Fig. 3B) in the paper shift circuits 200.

(2) *Successive parity errors.*—If on the second reading of a block of information a parity error is again found an alarm is actuated and a stop operation is carried out. After the first parity error the counting multivibrators 284, 286 (Fig. 3C) in the parity alarm circuit 280 will again be impulsed by a parity error signal from the parity error control circuit 260 when the tape has again been run back to the start of the block. As explained, the second multivibrator 286 then provides a "1" output (the recurring PE signal) through the coupled "or" circuit 288 to the parity error alarm (not shown). The same recurring PE signal is applied in the stop control unit 110 (Fig. 3A) through the "or" circuit 140 to the set input of the multivibrator 142 which controls the stop relay coil 144. This multivibrator 142 is then set to provide a "1" output, activating the stop relay coil 144 and also disabling the input "and" gate 152 and the "and" gate 174 in the start circuit (Fig. 3C). No further signals will be applied to the system until the start or SLO switches 112, 116 are actuated. The operation of the system in inhibiting printing and preventing paper shift is the same on the second parity error as on the first parity error.

(3) *Parity error—single line operation.*—In single line operation it is desired to print out the line despite the existence of a parity error. The fact of parity error should be indicated, however. Accordingly, in the parity alarm circuit 280 a multivibrator 290 is provided having its "1" output coupled to the output "or" circuit 288 which provides the parity error alarm. The set input of the multivibrator 290 is responsive to PE signals through a SLO relay 292 which is closed during single line operation. The multivibrator 290 is reset by start or SLO signals. Parity error signals from the parity check circuit (not shown in Fig. 3), therefore, set the multivibrator 290 and provide a signal for parity error alarm directly.

In the signal control unit 170 parity error signals are applied to the FR multivibrator 188 and the PE multivibrator 192 through a normally closed SLO relay 191. During single line operation, however, the SLO relay 191 is open, the multivibrators 188, 192 in the signal control 170 are not affected, and the system proceeds to a normal single line stop.

*Additional features.*—In the parity error control circuit 260 a three input "and" gate 272 is employed. The "and" gate 272 output is coupled, through a delay line 274 and an "or" circuit 276, to the reset input of the FR multivibrator 188. Two of the inputs to the "and" gate 272 are responsive individually to "0" outputs from the reverse multivibrator 254 and the PE multivibrator 192. The remaining input of the "and" gate 272 is responsive to outputs of the detector 300. When operating without a parity error signal or a reverse signal, therefore, outputs of the detector 300 are applied from this additional source to reset the FR multivibrator 188.

The output of the three input "and" gate 272 may also provide a useful safety stop feature whether operating in the forward or reverse direction. An output from this gate 272, labeled SS, may be coupled to the correspondingly identified inputs of "or" circuits 183, 193 in the stop forward and stop reverse circuits, respectively. The SS signal is provided at the start and end of reading of each block of information in normal operation. The SS signal is therefore an additional stop signal provided almost concurrently in time with the regular stop signals. The SS signal will stop the system, for example, if the parity error occurs in an LS, PC, or EM character. The signals (LS, PC, or EM and SS) are so close together in time that the tape station operation is not affected.

The detector for the start and end of information blocks (refer now to Fig. 4) utilizes a bistable multivibrator 302, a 70 μs. delay line 304, and 80 μs. delay line 306, and an output "and" gate 308. The time between pulses from magnetic tape may be approximately 100 μs., and thus it may be desired to provide a signal if 150 μs. have passed without another pulse. Input pulses reset the multivibrator 302, and also are applied to the 70 μs. delay line 304. From the 70 μs. delay line 304 the pulses set the multivibrator 302 and are applied to the second, 80 μs. delay line 306. The "1" output of the multivibrator 302 primes an input of the output "and" gate 308. If the state of the multivibrator 302 is not changed the output of the 80 μs. delay line 306 passes through the "and" gate 308 as an output signal. The multivibrator 302 is changed, however, by a second input pulse occurring prior to the expiration of the 150 total microseconds delay. Such a pulse resets the multivibrator 302 and disables the "and" gate 308, so that the first input pulse, delayed 150 μs., cannot pass through. The final input pulse of a series finds the "and" gate 308 primed by the multivibrator 302, and provides an output. The 70 and 80 μs. delay lines 304, 306 are employed as shown so that the multivibrator 302 will remain set until approximately 170 μs. after the arrival of the first pulse, assuming the second pulse follows the first by about 100 μs.

A considerable number of variations may be employed in the arrangements described. The speed of the printing system may be increased, for example, without taxing the operation of the electronic memory and control circuits. The coding arrangements and special signal combinations shown are but a particular example of those which may be employed in effecting a flexible control of a printing operation. The number of printing columns and the number of possible characters per column may be varied as desired. Values, when given, exemplify one arrangement which may be used in practicing the invention. It will be understood that conventional inverters and amplifiers may be used, and have been omitted for greater clarity and simplicity.

Thus there has been described a rapid and flexible control arrangement for a high-speed mechanical printer. The system provides a wide variety of operations, including normal, testing, and manually controlled operations. The accuracy of any of the input information received may be checked and transient errors reduced. Means are also described for selectively varying the amount of paper shift, and for coordinating paper shift with printer action.

What is claimed is:

1. A system for generating supervisory signals for the timed utilization of information provided as input in a high-speed printer, said information including special signal combinations and being grouped in blocks, said high-speed printer having a continuous cyclic operation and including means to control the movement of a printing medium, said printer also including interim storage means for storing said input information, said system comprising: settable control means; means responsive to said printer operation for providing distributed cyclic signals defining in point of time a write cycle and a read cycle and further providing timing signals during said print cycle; means responsive to said timing pulses for reading out said information from said interim storage; signal control means having a plurality of outputs and a gating network, said signal control means being responsive to said special signal combinations, said distributed cyclic signals, and the output of said settable control means for providing supervisory signals in timed sequence on said outputs, ones of said outputs controlling the flow of said input information to said interim storage means; an error control circuit responsive to parity errors in said blocks of information for modifying the operation of said signal control means; and shift control means responsive to said distributed cyclic signals, said supervisory signals, and the output of said settable control means for providing timed signals for controlling the movement of said printing medium.

2. A system for generating supervisory signals for the timed utilization of information provided as input in a high-speed printer, said information including special signal combinations and being grouped in blocks, said high-speed printer having a continuous cyclic operation and including means to control the movement of a printing medium, said system comprising: settable control means; means responsive to said printer operation for providing distributed cyclic signals; signal control means having a plurality of outputs and a gating network, said signal control means being responsive to said special signal combinations, said distributed cyclic signals, and the output of said settable control means for providing a plurality of certain sequences of supervisory signals on said outputs, said sequences including a normal sequence; an error control circuit responsive to parity errors in said blocks of information and coupled to said signal control means for modifying said normal sequence of supervisory signals on the occurrence of a parity error; alarm means responsive to said error control means and the occurrence of two successive parity errors for controlling said settable sequencing means; and means coupled to said means for providing distributed cyclic signals, said signal control means, and said settable control means for providing timed signals for controlling the movement of said printing medium.

3. In a system having an input station, an arrangement for converting input information characters grouped in blocks having special signal combinations into signals for controlling a high-speed continuously rotatable line-at-a-time printer, said printer including means for moving a printing medium, said arrangement comprising: means coupled to said printer for providing synchronizing signals defining in point of time a write cycle and a print cycle; parity check means responsive to said input information; means responsive to said special signal combinations, said synchronizing signals, and said parity check means to provide certain sequences of supervisory signals for said input station; magnetic memory matrix means to store information characters in different positions in different columns, each of said columns corresponding to a printing column in said printer; gating means responsive to said input information for applying addressing signals to the positions in the columns of said memory; means responsive to said special signal combinations for applying other addressing signals to the columns of said memory; means responsive to said synchronizing signals for reading like positions of all said columns simultaneously and the different ones of said positions in sequence, said memory being operated in alternating write and print cycles; and means responsive to said synchronizing signals, said special signal combinations, and said supervisory signal providing means for storing shift information during each write cycle and providing shift control signals from said information during the next subsequent write cycle.

4. A system for providing, from blocks of input information, supervisory control signals for a high speed printer, said system comprising: means for storing said input information; signal generating means responsive to the state of said printer for providing signals in synchronism therewith; settable control means for selecting the mode of operation of said printer; distributor means responsive to the output of said signal generating means and said settable control means for providing distributed synchronized signals defining in point of time a write cycle and a print cycle and further providing during said print cycle timing pulses synchronized with the operation of said printer; means responsive to said timing pulses for reading out said information from said means for storing; and signal control means responsive to said blocks of input information, said distributed signals, and the output of said settable control means for providing said supervisory control signals.

5. The system set forth in claim 4 including an error control circuit responsive to errors in said blocks of input information for alternatively controlling the operation of said signal control means.

6. In a system having an information input station, an arrangement for converting input information having special signal combinations into signals for controlling a high speed printer, said printer including means for moving a printing medium and storage means for receiving and storing information from said input station, said arrangement comprising: signal generating means operative in synchronism with said printer; distributor means responsive to the output from said generating means for providing distributed synchronized signals defining in point of time a write cycle during which information is written into said storage means and a print cycle during which said latter information is read out of said storage means for printing on said medium, said distributor means also providing a series of timing signals during said print cycle; means responsive to said timing signals and operatively connected to said storage means for reading out information from said storage means during said print cycle; signal control means responsive to said distributed signals and said special combinations for providing supervisory control signals for controlling the operation of said input station and said printer; and a shift control circuit responsive to said distributed signals, said special signal combinations, and said supervisory control signals for controlling the movement of said printing medium.

7. A system for generating supervisory control signals for the timed utilization of information provided as input in a high speed printer, said information including special signal combinations, said high speed printer having a continuous cyclic operation and including means to control the movement of a printing medium, said system comprising: settable control means for manually selecting the mode of operation of said printer; means responsive to said printer operation for providing distributed cyclic signals defining in point of time a write cycle and a print cycle; memory means for storing said information; signal control means responsive to said special signal combinations, said distributed signals, and the output of said settable control means for controlling the flow of said input information to said memory during said write cycle; and gating means responsive to said distributed signals for gating the stored information out of said memory to said printer during said print cycle.

References Cited in the file of this patent

UNITED STATES PATENTS

| | | |
|---|---|---|
| 2,207,743 | Larson | July 16, 1940 |
| 2,680,240 | Greenfield | June 1, 1954 |
| 2,702,380 | Brustman | Feb. 15, 1955 |
| 2,708,267 | Weidenhammer | May 10, 1955 |
| 2,714,843 | Hooven | Aug. 9, 1955 |
| 2,807,005 | Weidenhammer | Sept. 17, 1957 |
| 2,850,566 | Nelson | Sept. 2, 1958 |